(12) United States Patent
Bennett et al.

(10) Patent No.: US 12,422,105 B2
(45) Date of Patent: Sep. 23, 2025

(54) PRESSURE PULSE GENERATION

(71) Applicant: Halliburton Energy Services, Inc., Houston, TX (US)

(72) Inventors: David Bennett, Houston, TX (US); Graham Jack, Aberdeen (GB); Iain J. Shepherd, Aberdeen (GB); Terry Don Bickley, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 74 days.

(21) Appl. No.: 18/389,045

(22) Filed: Nov. 13, 2023

(65) Prior Publication Data
US 2025/0155089 A1    May 15, 2025

(51) Int. Cl.
*F17D 1/075*    (2006.01)
*F15B 1/16*    (2006.01)
*F16L 55/46*    (2006.01)

(52) U.S. Cl.
CPC .............. *F17D 1/075* (2013.01); *F15B 1/165* (2013.01); *F15B 2201/411* (2013.01); *F16L 55/46* (2013.01)

(58) Field of Classification Search
CPC .... F17D 1/075; F15B 1/165; F15B 2201/411; F16L 55/46
See application file for complete search history.

(56) References Cited

U.S. PATENT DOCUMENTS

| | | | |
|---|---|---|---|
| 5,708,193 A | 1/1998 | Ledeen et al. | |
| 6,993,963 B1 | 2/2006 | Gudmundsson | |
| 9,651,190 B1* | 5/2017 | Hailey | B08B 9/0325 |
| 10,801,658 B2* | 10/2020 | Poe | F16L 41/004 |
| 11,313,755 B2* | 4/2022 | Jagannathan | F16L 55/46 |
| 11,448,582 B2* | 9/2022 | Bennett | B08B 9/0325 |
| 11,754,425 B2* | 9/2023 | Newman | F16L 55/48 |
| | | | 73/37 |
| 2021/0332953 A1 | 10/2021 | Jagannathan | |
| 2022/0003629 A1 | 1/2022 | Jagannathan et al. | |
| 2022/0404180 A1 | 12/2022 | Newman et al. | |

FOREIGN PATENT DOCUMENTS

| | | |
|---|---|---|
| CN | 213180069 U | 5/2021 |
| WO | 2019032606 A1 | 2/2019 |
| WO | 2019135737 A1 | 7/2019 |
| WO | 2019156661 A1 | 8/2019 |
| WO | 2019156742 A1 | 8/2019 |

(Continued)

OTHER PUBLICATIONS

International Search Report & Written Opinion; PCT Application No. PCT/US2023/079833; mailed Aug. 13, 2024.

(Continued)

*Primary Examiner* — Dustin T Nguyen
(74) *Attorney, Agent, or Firm* — NOVAK DRUCE CARROLL LLP

(57) ABSTRACT

Systems and methods for creating a pressure pulse within a pipeline are disclosed. The method includes isolating a barrel of a pipeline inspection gauge (PIG) station from the pipeline, pressurizing the barrel up to a selected pressure, and opening an isolation valve between the barrel and the pipeline, thereby creating the pressure pulse.

6 Claims, 2 Drawing Sheets

(56) References Cited

FOREIGN PATENT DOCUMENTS

| WO | 2019199344 | A1 | 10/2019 |
| WO | 2019245583 | A1 | 12/2019 |
| WO | 2020040800 | A1 | 2/2020 |
| WO | 2020117321 | A1 | 6/2020 |
| WO | 2020162964 | A1 | 8/2020 |

OTHER PUBLICATIONS

English abstract of CN213180069; retrieved from www.espacenet.com on Aug. 16, 2024.

* cited by examiner

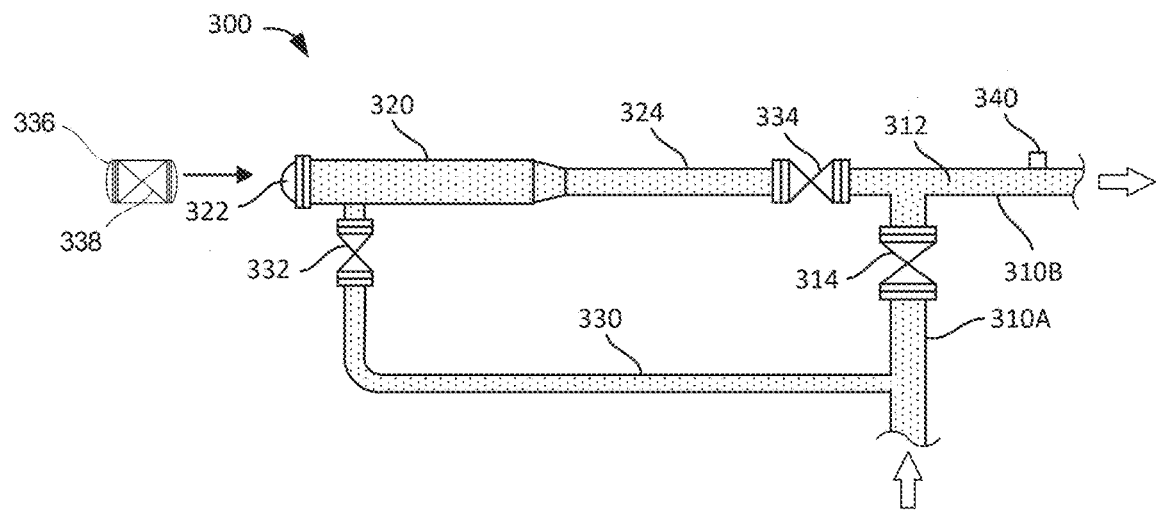
FIG. 3
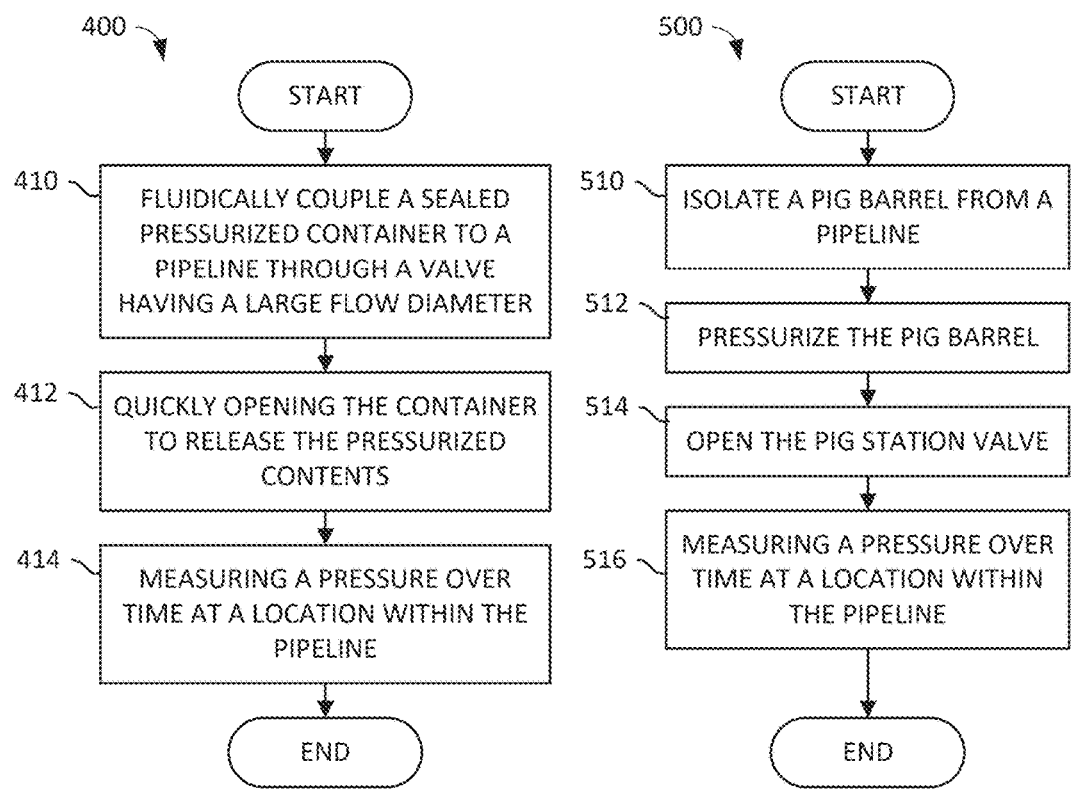
FIG. 4
FIG. 5

PRESSURE PULSE GENERATION

TECHNICAL FIELD

The present technology pertains to pressure pulses in pipelines for detection of deposits and pipe inspection.

BACKGROUND

Pressure pulses are created in pipelines pressure to detect and locate depositions and leaks. This is conventionally performed by closing an inline valve that creates a pressure pulse in the pipeline. This method has the effect of shutting off the flow in the pipeline, which makes this method unsuitable for certain operations. Another conventional method of creating a pressure pulse is either injecting mass or bleeding off mass through a diagnostic port. This method does not scale up to larger diameter pipelines, however, as the diagnostic ports are relatively small and limit the amount of mass that can be injected/removed.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 depicts a schematic representation of an example PIG station configured to generate a pressure pulse, in accordance with various aspects of the subject technology.

FIGS. 4-5 are flowcharts of example methods of generating a pressure pulse in a pipeline, in accordance with various aspects of the subject technology.

DETAILED DESCRIPTION

Figure 1:
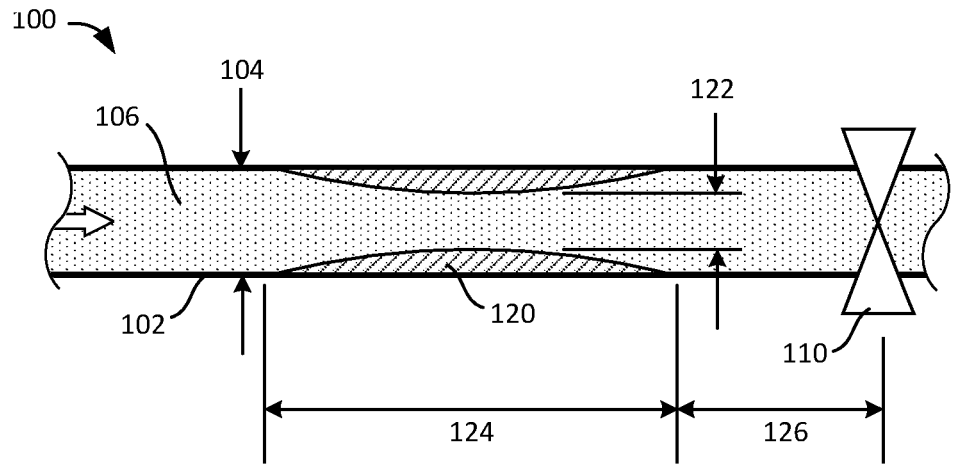
FIG. 1 illustrates an example of a deposition within a pipeline, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be apparent from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Examination of pipelines for interior deposits, e.g., hydrates, wax, asphaltenes and sand, and damage is conventionally done by generating a pressure pulse in the pipeline by closing a quick-acting valve located in the pipeline and measuring the pressure in the pipeline. One challenge with this technique is that the flow within the pipeline is inherently stopped by closure of the valve while the pressure wave propagates through the pipeline. In certain situations, even a short interruption in the fluid flow is detrimental and, therefore, this technique is not suitable.

An alternate conventional method of generating the pressure pulse is to introduce, or remove, a quantity of fluid through a diagnostic port. This is generally not effective for large pipelines, e.g., an internal diameter (ID) greater than 15 inches, as diagnostic ports are usually 2 inches in diameter and therefore limit the rate at which fluid can be introduced.

The disclosed systems and methods address the foregoing problems by enabling an operator to generate a pressure wave in large pipelines without interrupting the normal flow within the pipeline. Pipeline Inspection Gauges (PIGs) are spherical or cylindrical devices used to clean and/or inspect pipelines. The device name "pig" originates from the initial cleaning devices, which were bundles of straw wrapped with wire or leather that were forced through the pipeline, producing a squealing sound. The phrase "pipeline inspection gauge" is a backronym that represents the increased capabilities of modern devices. A key attribute of PIGs is that they closely conform to the ID of the pipeline. A PIG station, where a PIG is introduced into or removed from a pipeline, must therefore be connected to the pipeline through a pipe and valve having an ID that is greater than or equal to the ID of the pipeline. Use of this large-ID valve to create the pressure pulse is one of the disclosed methods of overcoming the limitation of the small diagnostic port while also avoiding shutting down the production flow of the pipeline.

FIG. 1 illustrates an example portion 100 of a pipeline 102 containing a deposition 120, in accordance with various aspects of the subject technology. The pipeline 102 has an internal diameter 104 The flow is from left to right and a quick-acting valve 110 is located at the down-stream end of this portion 100 of the pipeline 102. A quick-acting hydraulically activated valve can be closed in about one tenth of a second. In this example, there is a solids deposition 120, e.g., a build-up of wax, extending over a distance 124 of the pipeline. The deposition is located at a distance 126 from the valve 110. The profile of the deposition in this example tapers over a portion of the distance 124, e.g., 20% of distance 124, at each end and has a reduced diameter 122 in the center portion, e.g., reduced from 10.2 cm to 9.8 cm.

A quick closure of the valve 110 will create a pressure pulse that travels from the valve 110 up-stream, i.e., from right to left in FIG. 1, and down-stream, i.e., from left to right in FIG. 1, in the pipeline 102. The magnitude of the pressure pulse will be governed by the Jaukowsky water-hammer equation $$\Delta P = \rho * a * \Delta v \qquad \text{Eqn. 1}$$

where:
ΔP magnitude of the pressure wave (Pa)
ρ fluid density (kg/m3)
a speed of sound in the fluid (m/s)
Δv change in fluid velocity (m/s)

The magnitude of the pressure pulse generated by closure of quick-acting valve 110 can be measured immediately up-stream by using a pressure transducer (not shown in FIG. 1). When the pipeline is sufficiently long, the pressure increase immediately up-stream of the quick-acting valve 110 will be given by Eqn. 1.

A pressure pulse travelling into a pipeline carrying an oil and gas mixture will momentarily arrest the flow; that is, the pressure pulse will stop the flow. The pressure pulse will travel along the pipeline at the in-situ speed of sound. Therefore, the oil and gas will be brought to rest as quickly as the pressure pulse travels through the pipeline.

As the flow is brought to rest, the pressure loss due to wall friction, e.g., the pressure drop caused by the reduced internal diameter 122 of the pipeline 102, will be made available. This frictional pressure drop will propagate back up the pipeline 102 and can be measured and is often called line-packing.

Figure 2:
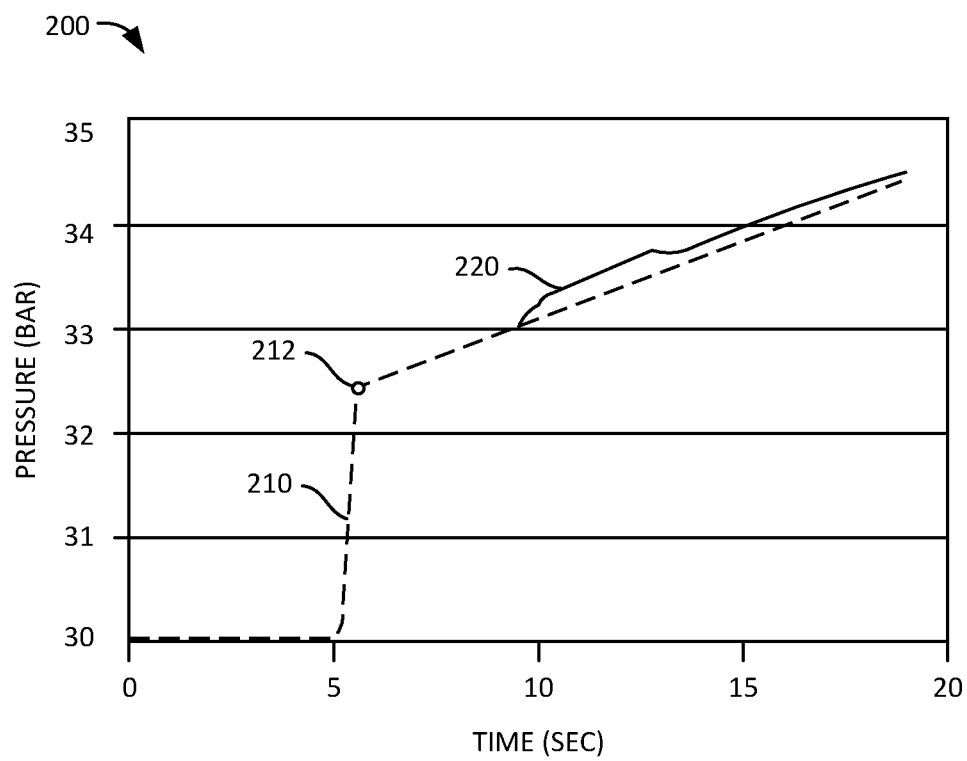
FIG. 2 depicts an example pressure signal measured is a pipeline having the deposition of FIG. 1, in accordance with various aspects of the subject technology.

FIG. 2 depicts an example pressure signal measured is a pipeline having the deposition of FIG. 1, in accordance with various aspects of the subject technology. The water-hammer and line-packing were calculated for the horizontal pipeline of FIG. 1 with multiphase gas-liquid mixture 106, where deposition 120 restricts the flow in a particular interval over distance 124. Curve 210 is for the case of a "clean" pipeline, i.e., without deposit 120, and curve 220 is the pressure for the case when deposit 120 is present.

Frictional pressure drop in pipelines is governed by the Darcy-Weisbach equation:

$$\Delta P = \left(\frac{f}{2}\right)\left(\frac{\Delta L}{d}\right) * \rho * v^2 \qquad \text{Eqn. 2}$$

where:
f friction factor (dimensionless)
ΔL pipe length (m)
d pipe diameter (m)
ρ fluid density (kg/m3)
a speed of sound in the fluid (m/s)
v fluid velocity (m/s)
The following conditions were assumed:

| | |
|---|---|
| Pipeline length | 2 km |
| Internal diameter | 0.1024 m |
| Oil density | 850 kg/m³ |
| Gas Specific gravity | 0.8 (dimensionless). |
| Speed-of-sound in mixture | 250 m/s |
| Flowline inlet pressure | 35 bar |
| Friction factor | 0.023 (dimensionless). |
| Temperature | 40 degrees C. |
| Gas-oil-ratio | 400 scf/STB. |
| Total flowrate | 8 kg/s |

The initial pressure increase from 30 bar to about 32.5 bar at point 212 is the water-hammer pressure and the more gradual pressure increase after that time is the line-packing pressure. Analysis of the line-packing pressure curve 220 makes it possible to locate the position 126 of deposition 120, to estimate the thickness of the deposition 120, i.e., half of the difference between the diameter 104 and the reduced diameter 122, and its total length 124.

Distances in the pipeline 102 can be determined from the times of features of the curve 220 using the equation $$\Delta L = 0.5 * a * \Delta t \qquad \text{Eqn. 3}$$

FIG. 3 depicts a schematic representation of an example PIG station 300 configured to generate a pressure pulse, in accordance with various aspects of the subject technology. PIG stations are configured to allow a PIG to be run through a portion of a pipeline, e.g., to mechanically remove deposits or to examine the pipeline interior through sensors on the PIG. As PIGs approximately match the ID of the pipeline, the barrel of a PIG station must be connected to the pipeline through a pipe and valve having an ID that is greater than or equal to the ID of the pipeline. PIG stations are regularly found on pipelines and/or can be added to existing pipelines in a routine manner. In certain embodiments, portable PIG stations are temporarily coupled to an existing isolation valve 334 of a pipeline.

In this example, the main pipeline entry is at the bottom of the pipeline 310A with flow continuing out the right-hand side of pipeline 310B. The flowing fluid may be a liquid, a gas, or a multiphase flow and may include suspended solids. During normal operations, valve 314 is open while the PIG station 300 is isolated by closure or one or more valves, e.g., bypass valve 332 and isolation valve 334, preventing any flow through the bypass line 330 into or out of the PIG barrel 320. The isolation valve 334 will have a clear internal fluid flow diameter equal or greater than the internal diameter of pipeline 310B, thus enabling a PIG to move from the barrel 320 through the valve 334 into the pipeline 310B. All pipes 310, 330 and PIG barrel 320 are filled with a fluid 312, e.g., a compressible gas/oil mixture.

Utilizing the PIG station 300 to create a pressure pulse in pipeline 312 may be accomplished in multiple ways. In general, the advantage of using the PIG barrel 320 as the source of the pressure pulse is derived from the volume of the PIG barrel 320 and the diameter of the connecting pipe 324, compared to the volume of fluid that can be injected or removed from an inspection or sampling port of the pipeline 310. These ports are generally quite small, e.g., typically range in size from 0.5 inches to 2 inches, compared to large pipelines, e.g., a pipeline having an ID of 15 inches or greater, as they are intended only for monitoring or sampling the fluid. The diameter of the PIG barrel 320 and pipe 324 are at least the same diameter as the pipeline 310 and, as shown in FIG. 3, the PIG barrel 320 may be larger than the diameter of pipeline 310. The entire connected volume between the bypass valve 332 and the isolation valve 334, also referred to herein as the PIG station valve, including the volume of the PIG barrel 320, is available to be pressurized.

In one embodiment, PIG station valve 334 is a quick-acting valve. Bypass valve 332 and PIG station valve 334 are closed and the PIG barrel 320 is pressurized up to a determined pressure that is selected based in part on the pressure and flow of the fluid 312 in pipeline 310. After the determined pressure is reached, the PIG station valve 334 is quickly opened, thereby generating a pressure pulse that propagates into pipeline 310. The pressure signal is measured by pressure sensor 340 coupled to the pipeline at one or many possible locations, as known to those of skill in the art.

In another embodiment, bypass valve 332 and PIG station valve 334 are closed and a flexible high pressure bladder 336 with an embedded bladder valve 338 is inserted into the PIG barrel 320 through closure 322. The bladder valve 338 is closed and the bladder pressurized to a determined pressure. After closing the closure 322, thus sealing the PIG barrel 320, the PIG station valve 334 is opened such that the fluid pressure in the PIG barrel 320 is equalized with the pressure of the fluid 312 in the main line 310. Once the pressures are equalized, the embedded bladder valve 338 is opened to create the pressure pulse.

In another embodiment, bypass valve 332 and PIG station valve 334 are closed and a pressurized rigid container 336 with an embedded container valve 338 is inserted into the PIG barrel 320 through closure 322. After closing the closure 322, thus sealing the PIG barrel 320, the PIG station valve 334 is opened such that the fluid pressure in the PIG barrel 320 is equalized with the pressure of the fluid 312 in the main line 310. Once the pressures are equalized, the embedded container valve 338 is opened to create the pressure pulse.

The pressures to which the PIG barrel 320, the bladder, or the container are pressurized are calculated utilizing Eqns. 1 & 2.

FIG. 4 is a flowchart 400 of an example method of generating a pressure pulse in a pipeline, in accordance with various aspects of the subject technology. This example describes the method in very general terms, as there are multiple possible embodiments that accomplish the disclosed steps. In step 410, a pressurized container is coupled to a pipeline through a valve, and any intermediate pipe, that has a large ID.

In this document, the term "large" means that a parameter of a device is comparable in scale to a similar parameter of a reference object. For example, a large valve will have a fluid-flow ID that is approximately the same or larger than an ID of a pipeline to which the valve is coupled. In certain embodiments, the valve ID is approximately the same as the Pipeline ID. In certain embodiments, the valve ID is greater than 50%, greater than 75%, or greater than 90% of the pipeline ID. Similarly, a large pipeline will have an ID that is much greater, e.g., 3× to 10× or more, than the ID of a sampling port.

In certain embodiments, the pressurized container is a pipe or chamber, e.g., barrel 320, that is fluidically coupled to the pipeline 320A/310B and is pressurized through an external valve (not shown in FIG. 3) so that the entire volume of the chamber is at a selected pressure. In certain embodiments, the selected pressure is greater than the pressure of the production flow of liquid in the pipeline 310A/310B. In certain embodiments, the pressurized container is a separate object, e.g., a pressurized container similar to a SCUBA tank, that is introduced into a chamber, e.g., barrel 320, that is fluidically coupled to the pipeline 320A/310B. In certain embodiments, the separate object is a flexible bladder that is inserted into the isolated barrel 320 then pressurized. In certain embodiments, the pressurized container is vented into the isolated barrel 320, thus pressurizing the barrel 320. Other means of providing a volume of pressurized fluid in barrel 320 will be obvious to the those of skill in the art from the disclosed examples.

In step 412, the pressurized barrel 320 is suddenly vented into the pipeline. This can be accomplished by opening the quick-acting valve 334 of FIG. 3, if the barrel 320 is pressurized, or by opening an embedded valve of a pressurized container disposed within the barrel 334 while valve 334 is already open.

Step 414 monitors a pressure in the pipeline at a location suitable for the metering needs and system configuration. In certain embodiments, the sensor location is along pipeline 310A, i.e., up-stream of the PIG station 300. In certain embodiments, the sensor location is along pipeline 310B, i.e., down-stream of PIG station 300. In certain embodiments, the distance from valve 334 to the sensor location is in the range of a meter to many kilometers. In certain embodiments, the measured signal is evaluated as described with respect to FIG. 2.

FIG. 5 is a flowchart 500 of another example method of generating a pressure pulse in a pipeline, in accordance with various aspects of the subject technology. This example is very specific to the example PIG station configuration of FIG. 3. In step 510, the PIG barrel 320 is isolated by closure of valves 332, 334. The barrel is pressurized in step 512, for example by introducing fluid into the barrel 320 until the pressure in the barrel 320 is at the selected pressure. Valve 334 is quickly opened in step 514, creating a pressure wave in the fluid 312 in pipelines 310A and 310B. The pressure in at least one of the pipelines 310A, 310B is measured, e.g., by pressure sensor 340 disposed along pipeline 310B.

In certain embodiments, objects traversing a pipeline, e.g., a PIG launched from PIG station 300 into pipeline 310B, may be tracked using this pressure pulse generation capability. In addition, pressure signals, similar to mud pulses used to send information up a wellbore, may be generated using the disclosed system and methods, thus enabling signals to be sent to the object.

In summary, the disclosed systems and methods provide the ability to create pressure waves, particularly in large diameter pipelines that are much larger in ID than the ID of diagnostic ports coupled to the pipeline. Certain embodiments of the disclosure are implemented using equipment that is already in place on pipelines and used for other purposes.

For clarity of explanation, in some instances the present technology may be presented as including individual functional blocks including functional blocks comprising devices, device components, steps or routines in a method embodied in software, or combinations of hardware and software.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a non-volatile computer-readable memory, or other data storage medium, comprising program code including instructions that, when executed, performs one or more of the method, algorithms, and/or operations described above. The computer-readable data storage medium may form part of a computer program product, which may include packaging materials.

A computer-readable memory, as used herein, includes any type of storage media, e.g., a random access memory (RAM), a synchronous dynamic random access memory (SDRAM), a read-only memory (ROM), a non-volatile random access memory (NVRAM), an electrically erasable programmable read-only memory (EEPROM), a FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The phrase "urging an object" or similar means the application of a force to the object in a manner that will try and move the object toward a defined position or in a specific direction without implying that the object moves or that the object is restricted from moving in another direction, even backward with respect to the direction of the applied force.

Claim language reciting "an item" or similar language indicates and includes one or more than one of the items. For example, claim language reciting "a part" means one part or multiple parts.

Moreover, claim language reciting "at least one of" a set indicates that one member of the set or multiple members of the set satisfy the claim. For example, claim language reciting "at least one of A and B" means A, B, or A and B.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Statements of the disclosure include:

(A1) A method of creating a pressure pulse within a pipeline, comprising: isolating a barrel of a pipeline inspection gauge (PIG) station from the pipeline; pressurizing the barrel up to a selected pressure; and opening an isolation valve between the barrel and the pipeline, thereby creating the pressure pulse.

(A2) The method of A1, wherein: the step of pressurizing the barrel comprises: opening the barrel from the outside; inserting a pressure container with an embedded valve into the barrel; closing the barrel; and opening the embedded valve.

(A3) The method of A2, wherein the step of pressurizing the barrel comprises: opening the isolation valve after the barrel is closed and before the embedded valve is opened, thereby allowing a pressure in the barrel to equalize with a pressure in the pipeline, then closing the isolation valve.

(A4) The method of A2, wherein the pressure container is a flexible high-pressure bladder.

(A5) The method of A2, wherein the pressure container is a rigid pressurized container.

(A6) The method of A2, wherein the selected pressure is greater than the pressure in the pipeline.

(A7) The method of A2, wherein the step of opening the isolation valve is performed while fluid is flowing through the pipeline.

(B8) A system for creating a pressure pulse within a pipeline, comprising: a pipeline inspection gauge (PIG) station having a barrel coupled to the pipeline through an isolation valve having a flow diameter equal to an internal diameter of the pipeline; and a means of pressurizing the barrel up to a selected pressure.

(B9) The system of B8, wherein the selected pressure is greater than the pressure in the pipeline.

(B10) The system of B8, wherein the means of pressurizing the barrel comprises: opening the barrel from the outside; inserting a pressure container with an embedded valve into the barrel; closing the barrel; and opening the isolation valve to allow the barrel to fill with fluid from the pipeline and a pressure in the barrel to equalize with a pressure in the pipeline; and opening the embedded valve.

(B11) The system of B10, wherein the pressure container is a flexible bladder.

(B12) The system of B10, wherein the pressure container is a rigid container.

(B13) The system of B8, wherein the means of pressurizing the barrel comprises introducing additional fluid into the barrel from the outside while the isolation valve is closed.

(B14) The system of B13, wherein the isolation valve is a quick-acting valve.

(B15) The system of B8, wherein the pipeline has an internal diameter of 15 inches or greater.

What is claimed is:

1. A method of creating a pressure pulse within a pipeline, comprising:
    isolating a barrel of a pipeline inspection gauge (PIG) station from the pipeline;
    pressurizing the barrel up to a selected pressure by:
        opening the barrel from the outside;
        inserting a pressure container with an embedded valve into the barrel;
        closing the barrel; and
        opening the embedded valve; and
    opening an isolation valve between the barrel and the pipeline, thereby creating the pressure pulse.

2. The method of claim 1, wherein the step of pressurizing the barrel further comprises:
    opening the isolation valve after the barrel is closed and before the embedded valve is opened, thereby allowing a pressure in the barrel to equalize with a pressure in the pipeline, then closing the isolation valve.

3. The method of claim 1, wherein the pressure container is a flexible high-pressure bladder.

4. The method of claim 1, wherein the pressure container is a rigid pressurized container.

5. The method of claim 1, wherein the selected pressure is greater than a pressure in the pipeline.

6. The method of claim 1, wherein the step of opening the isolation valve is performed while fluid is flowing through the pipeline.

* * * * *